United States Patent
Nishimine et al.

(12) 
(10) Patent No.: US 6,304,794 B1
(45) Date of Patent: Oct. 16, 2001

(54) METHOD FOR DESIGNING A METAL MOLD

(76) Inventors: Naohide Nishimine, 2606, Akabane, Ichikaimachi, Hagagun, Tochigi 321-34; Hisanori Torii, 1-3, Bunka 2 - chome, Sumida-ku, Tokyo 131; Nobunori Oji, 2606, Akabane, Ichikaimachi, Hagagun, Tochigi 321-34; Keiichiro Sugai, 2606, Akabane, Hagagun, Tochigi 321-34, Ichikaimachi; Yuko Tamiya, 2606, Akabanem Hagagun, Tochigi 321-34, Ichikaimachi, all of (JP)

( * ) Notice: Subject to any disclaimer, the term of this patent is extended or adjusted under 35 U.S.C. 154(b) by 0 days.

(21) Appl. No.: 08/988,240

(22) Filed: Dec. 10, 1997

Related U.S. Application Data (63) Continuation of application No. PCT/JP97/01229, filed on Apr. 10, 1997.

(30) Foreign Application Priority Data

Apr. 11, 1996 (JP) ................................................. 08-089690
Jan. 16, 1997 (JP) ................................................. 09-005708

(51) Int. Cl.$^7$ ................................................. B29C 39/00
(52) U.S. Cl. ................................. 700/197; 703/6; 164/169
(58) Field of Search ................................. 700/197, 200, 700/204, 97, 98, 110, 118, 146; 29/527.1, 527.4; 425/542, 405.2; 164/159, 154.1, 139, 169; 703/1, 2, 6, 9

(56) References Cited

U.S. PATENT DOCUMENTS

| | | | |
|---|---|---|---|
| 5,125,821 | * 6/1992 | Saeki et al. | 425/170 |
| 5,377,119 | * 12/1994 | Backer et al. | 364/476 |
| 5,435,818 | * 7/1995 | Mashige et al. | 65/29.12 |
| 5,677,844 | * 10/1997 | Kubo | 700/146 |
| 5,811,133 | * 9/1998 | Saito et al. | 425/145 |
| 5,908,128 | * 6/1999 | Krishnakumar et al. | 215/381 |
| 5,925,208 | * 7/1999 | Dronzek, Jr. | 156/257 |

FOREIGN PATENT DOCUMENTS

| | | |
|---|---|---|
| 7-9522 | 1/1995 | (JP) . |
| 7-9523 | 1/1995 | (JP) . |
| 7-60857 | 3/1995 | (JP) . |
| 7-112481 | 5/1995 | (JP) . |
| 7-117113 | 5/1995 | (JP) . |

OTHER PUBLICATIONS

The Plastics, vol. 35, No. 4 Apr. 1989 (Tokyo), Toshikazu Ishida "Utilization of Computer in Material Manufacture (in Japanese)" pp. 39–48.

"Handbook of Electronics, Information and Communications", IEICE, pp. 36, 37, Mar. 1988.

\* cited by examiner

*Primary Examiner*—William Grant
*Assistant Examiner*—Sheela S. Rao
(74) *Attorney, Agent, or Firm*—Pillsbury Winthrop LLP (57) ABSTRACT

When a molten plastic is molded using a metal mold, sufficient cooling time has to elapse before the metal mold is opened, but this cooling time restricts the production per unit time. If a metal mold is opened without sufficient cooling, the plastic undergoes significant deformation by thermal shrink. If this deformation can be estimated and the metal mold designed so as to make allowance for the anticipated deformation, it will be possible to produce a molding with a shape that is equal to the design dimensions, despite shortening the cooling time. The finite element method is used to obtain the deformation. Mold design can also be performed taking account of the deformation due to the hydrostatic pressure that is produced when the molding is filled with its liquid contents. In addition, as for a portion of an in-mold labelled container which include lamination construction, the deformation due to thermal shrink is not estimated as a container which an in-mold label is not being applied. On this case, we have a method which is simulating deformation after adding parameters relating to the material of this label, said parameters including at least its thermal conductivity and coefficient of linear expansion. The thermal conductivity deformation simulation is by the finite element method. Production per unit time can be increased and metal mold design can be carried out independently of experience.

10 Claims, 9 Drawing Sheets

METHOD FOR DESIGNING A METAL MOLD

This is a Continuation of International Appl. No. PCT/JP97/01229 filed Apr. 10, 1997 which designated the U.S.

TECHNICAL FIELD

This invention is utilized in the design of metal molds for plastic products. It relates to a technique for shortening the time required for the plastic molding process by taking out the plastic molding from the metal mold at high temperature after having made allowance in the metal mold design for the deformation that occurs when the molding cools after taking out.

BACKGROUND TECHNOLOGY

Figure 10A:
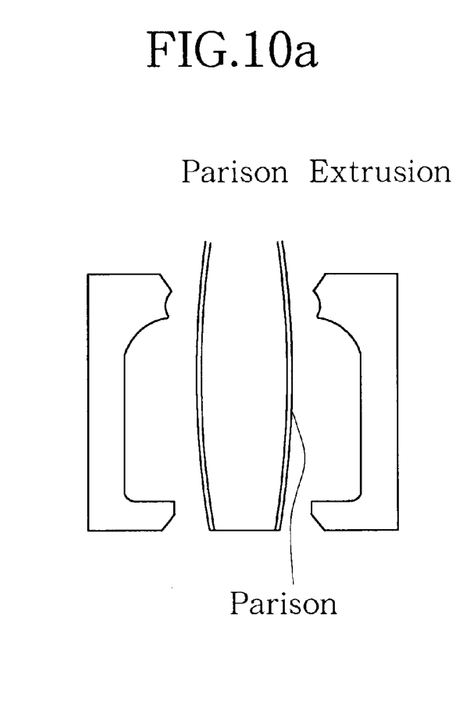
FIG. 10 shows the processes involved in manufacturing a detergent container by blow molding.
Figure 10B:
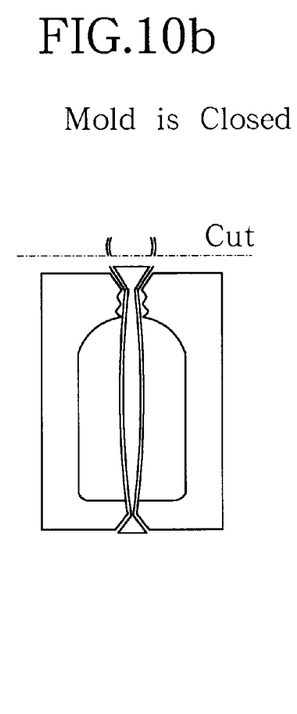
Figures 10C, 10D:
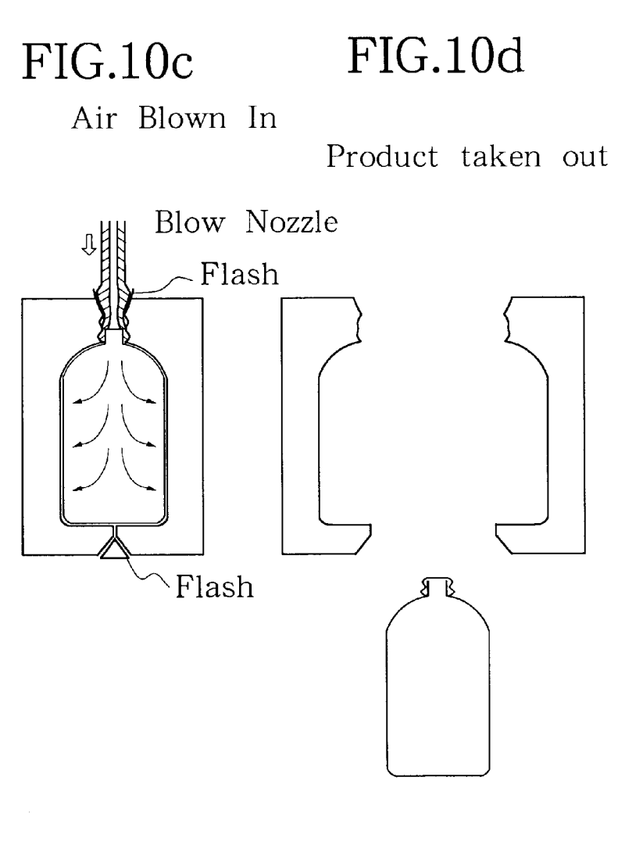

A widely-used method for molding plastic is to extrude high-temperature molten plastic in a tubular shape, enclose this in a metal mold and make the tube expand by blowing air into it. A prior art example of this will be explained with reference to FIG. 10, which shows the process of manufacturing a container by blow molding. As shown in FIG. 10(a), molten plastic in tubular shape (the parison) is extruded into the middle of a split metal mold, and as shown in FIG. 10(b), the metal mold is then closed. As shown in FIG. 10(c), when air is blown into the molten plastic, the plastic adheres closely to the inner wall of the metal mold and assumes the same shape as this inner wall. At this point in time the molten plastic is at a high temperature of for example 200° C., and it is cooled and solidified by keeping it in the metal mold while continuing to blow in high-pressure air. Although the time required for this cooling varies according to the type of plastic and the form of the molding, cooling time has hitherto been determined by aiming for a temperature at which the deformation due to thermal shrink of the resin after taking out from the metal mold is linear. As shown in FIG. 10(d), when the metal mold is opened, the molding is took out.

The molding shown in FIG. 10 is a container (a bottle) which will be marketed after being filled with a liquid. The usual aim is to open the metal mold when the resin has cooled to about 50° C. A dozen or so seconds are required for this cooling.

As previously mentioned, it takes time to cool the high-temperature molten plastic to a point at which the metal mold can be opened. Production per unit time and production cost are in proportion, and in a manufacturing process in which time management in carried out in units of seconds, even a short cooling time of a dozen or so seconds should be shortened in order to achieve lower production cost.

In order to obtain data on the shortest practical cooling time, the inventors therefore performed repeated experiments in which a metal mold was opened while still at a high temperature. As a result, it was found that if a metal mold is separated before the conventionally employed cooling time has elapsed, the high-temperature molten plastic contracts greatly and undergoes nonlinear deformation. Accordingly, the targeted molding shape could not be obtained and cooling time could not be shortened.

A container manufactured by above-mentioned blow molding is pasted a label after cooling. While, it is also used a method that a label may be pasted in the molding process. This method is generally called as "in-mold labelling".

In the in-mold labelling, a label made by synthetic resin is placed on the inside of the metal mold before molding process and is pasted with the container by the heat of the molten plastic on the molding process so that the container and the label are formed as one body.

In the in-molding labelling, it is formed different two kinds of materials overlapping so that it is more difficult to predict deformations caused by the different heat shrinkage rates of the materials than to do for a container with no in-mold label.

In a prior method for manufacturing a container with an in-mold label, it is proposed a method for compensating deformations which is based on the view that the label face is so thin and becomes cool so rapidly because of it being contacted with the metal mold, that it happens shrinkage on more the container side than the label face after having taken it out from the metal mold and that the label face deforms (swells out) to the outside of the container However, deformation of a label face does not only depend on difference of shrinkage rates of the label material and the container material. For example, a label face bears not only the shrinkage of a container but also compression load from more than one directions parallel to the label face. Consequently, a label face does not always deform (swell out) to outside of the container.

In other words, a label face swells out (deforms to outside) by the bending effect caused by the difference of temperature of the resin thickness direction. However, the label face collapses (deforms to inside) by the shrinkage difference in the surrounding direction caused by the thickness distribution in the bottle height direction. The label face may collapse or swell out in depending on the initial condition of the container by the shrinkage difference of the label material and the container material.

The present invention has been devised in the light of this background. It is an object of this invention to provide a method and apparatus for designing a metal mold whereby a targeted molding shape can be obtained even though the cooling time in the plastic molding process is shortened. It is a further object of this invention to provide a method and apparatus for designing a metal mold whereby a molding can be manufactured with a shape which compensates for the deformation due to hydrostatic pressure resulting from the molding being filled with contents. It is yet another object of this invention to provide a method and apparatus for designing a metal mold whereby the metal mold can be designed without dependence on prior experience.

DISCLOSURE OF THE INVENTION

Plastic which has been released from a metal mold undergoes shrink deformation in the course of cooling to ordinary temperature. Conventionally, taking out of the plastic at a low temperature ensures a regularity in the resulting deformation, i.e. the deformation is linear, and therefore by ensuring that the reciprocal of the shrink factor (1/shrink factor) is reflected in the target molding shape, and by making the metal mold correspondingly larger, the manufacturability of the targeted molding shape (i.e. its design dimensions) can be guaranteed. However, the broad regularity mentioned above is not found in the course of the nonlinear shrink that occurs when a plastic molding is took out at high temperature.

The inventors have therefore invented a method and apparatus for metal mold design whereby a target molding shape is obtained even when the molding is took out at high temperature. This is achieved by using the finite element method to simulate deformation behavior, and then taking this deformation into account beforehand when preparing the metal mold shape.

According to a first aspect of the present invention there is provided a method for designing a metal mold comprising a first step of simulating the deformation that will occur in the initial shape of the molding (that is, its shape immediately prior to taking out from the metal mold) after it has been taken out from the metal mold (this initial shape being approximately equal to the shape of the metal mold); a second step of calculating the difference between the deformed shape obtained in this first step and the target molding shape; a third step of comparing this difference with a threshold; and a fourth step wherein, if this difference exceeds the threshold, a change is calculated in the initial shape on the basis of this difference.

In case of that it is preferable that a label is solvent bonded to a portion of the surface of the aforesaid molding, this label being of a different material from the main material of which the molding surface is formed; and the aforesaid first step comprises simulating deformation after adding parameters relating to the material of this label, said parameters including at least its thermal conductivity and coefficient of linear expansion.

The target molding shape can be designed so as not to include the deformation due to the internal pressure produced when the molding is filled with contents. Alternatively, it can be designed so as to include the deformation due to the internal pressure produced when the molding is filled with contents. For example, when the molding is a plastic container for filling with a liquid, the plastic container will deform when it is filled with the liquid. The metal mold can be designed with this deformation taken into account in advance.

The simulation is preferably based on the finite element method. (Regarding the finite element method, see "Denshi Joho Tsushin Handobukku" [Handbook of Electronics, Information and Communications] ed. by the IEICE Japan, pp.36–37.)

Hitherto, metal mold design has simply relied on repeated trial and error or on the experience of craftsmen. However, by using the finite element method the number of unsuccessful trial metal molds can be reduced and metal molds can be designed without dependence on prior experience.

According to a second aspect of the present invention there is provided an apparatus for designing a metal mold comprising means for inputting the initial shape of the metal mold (b0) in the form of three-dimensional information; and the following four means: a first means for calculating a simulation of the deformation that will occur after a molding equal in shape to this initial shape has been taken out from the metal mold; a second means for calculating the difference (xi) between the calculation result for the simulated deformation (ci) and a target molding shape; a third means for comparing this difference with a threshold; and a fourth means which, if this difference exceeds the threshold ($\epsilon$), applies a change to part of the initial shape on the basis of this difference; and means for causing the first to fourth means to operate repeatedly until the aforesaid difference becomes less than the threshold.

In case of that it is preferable that a label is solvent bonded to a portion of the surface of the aforesaid molding, this label being of a different material from the main material of which the molding surface is formed; and the aforesaid first means simulates deformation after adding parameters relating to the material of this label, said parameters including at least its thermal conductivity and coefficient of linear expansion.

The target molding shape can be designed so as not to include the deformation due to the internal pressure produced when the molding is filled with contents. Alternatively, it can be designed so as to include the deformation due to the internal pressure produced when the molding is filled with contents.

According to a third aspect of the present invention there is provided a recording medium on which is recorded a program for causing each of the aforementioned means to operate.

According to a fourth aspect of the present invention there is provided a metal mold designed by the aforementioned design apparatus.

As has been explained above, this invention can provide a metal mold whereby a target molding shape can be obtained despite the cooling time being shortened. It also enables a metal mold to be designed so that the molding product has a shape which compensates for the deformation due to the hydrostatic pressure that arises when the molding is filled with its contents. In addition, this invention enables a metal mold to be designed independently of prior experience. As an in-mold labeled container, this invention can provide a metal mold whereby a target molding shape can be obtained despite the cooling time being shortened.

PREFERRED EXAMPLES TO EMBODYING THIS INVENTION

An embodiment of the present invention will be explained with reference to FIG. 1, which is a flowchart of the metal mold design method according to a specific embodiment of this invention.

This invention is a metal mold design method comprising a first step (S1) of simulating the deformation that will occur in the initial shape of a molding (that is, its shape immediately prior to taking out from the metal mold) after it has been taken out from the metal mold, a second step (S2) of calculating the difference between the deformed shape obtained by this first step and a target molding shape, a third step (S3) of comparing this difference with a threshold, and a fourth step (S4) wherein, if this difference exceeds the threshold, a change is calculated in the initial shape on the basis of this difference.

Figure 5:
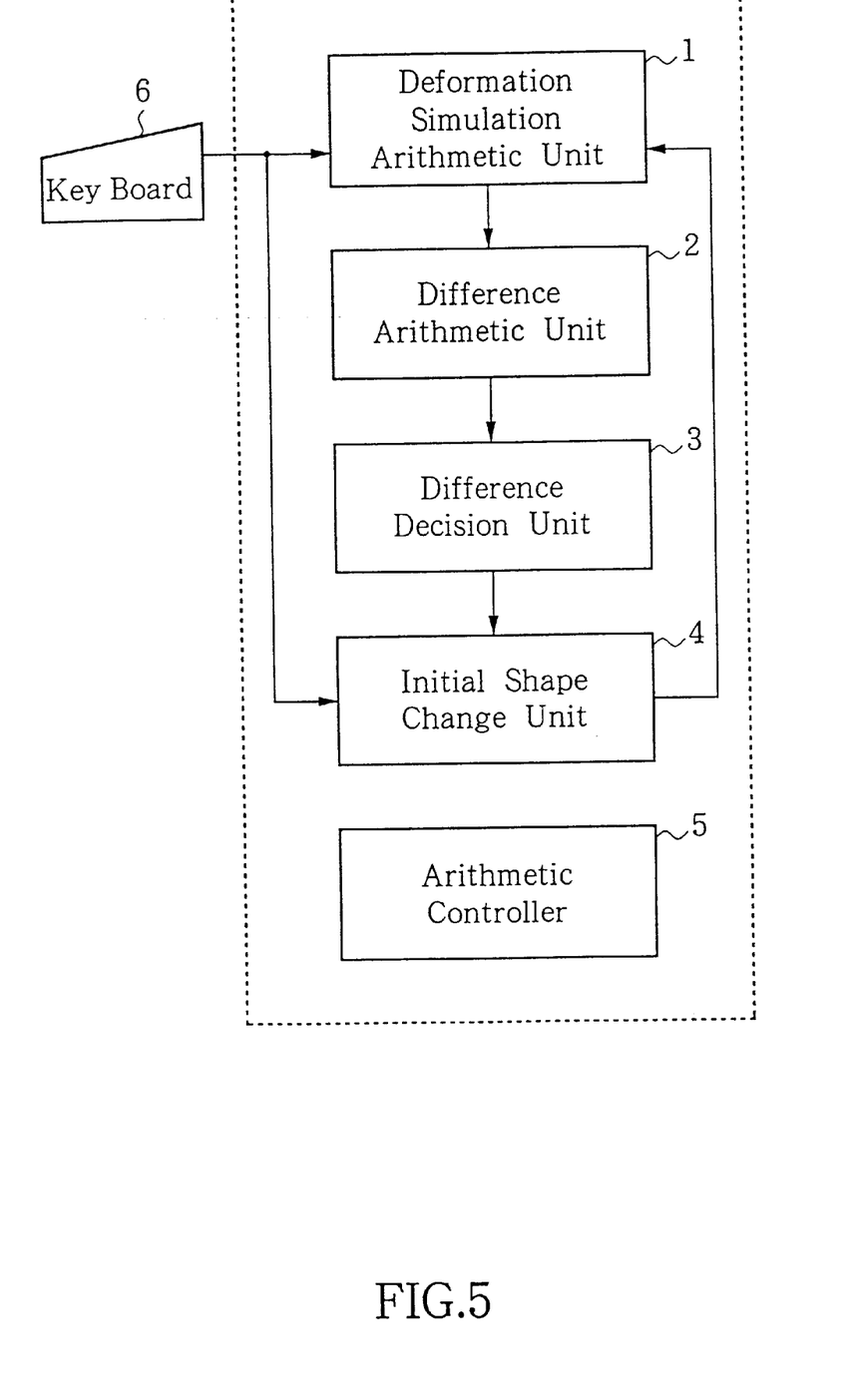
FIG. 5 is a block diagram of a metal mold design apparatus according to an embodiment of this invention.

Apparatus for performing the metal mold design method according to the present invention is shown in FIG. 5, which is a block diagram of a metal mold design apparatus according to an embodiment of this invention.

This invention is a metal mold design apparatus comprising keyboard 6 as means for inputting the initial shape of the metal mold (b0) in the form of three-dimensional information; deformation simulation arithmetic unit 1 as the first means which calculates a simulation of the deformation that will occur after a molding equal in shape to this initial shape has been taken out from the metal mold; difference arithmetic unit 2 as the second means which calculates the difference between the calculation result for the simulated deformation and a target molding shape; difference decision unit 3 as the third means which compares this difference with a threshold; initial shape change unit 4 as the fourth means which, if this difference exceeds the threshold, applies a change to part of the initial shape on the basis of this difference; and arithmetic controller 5 as means for causing deformation simulation arithmetic unit 1, difference arithmetic unit 2, difference decision unit 3 and initial shape change unit 4 to operate repeatedly until the aforesaid difference becomes less than the threshold.

Figure 2:
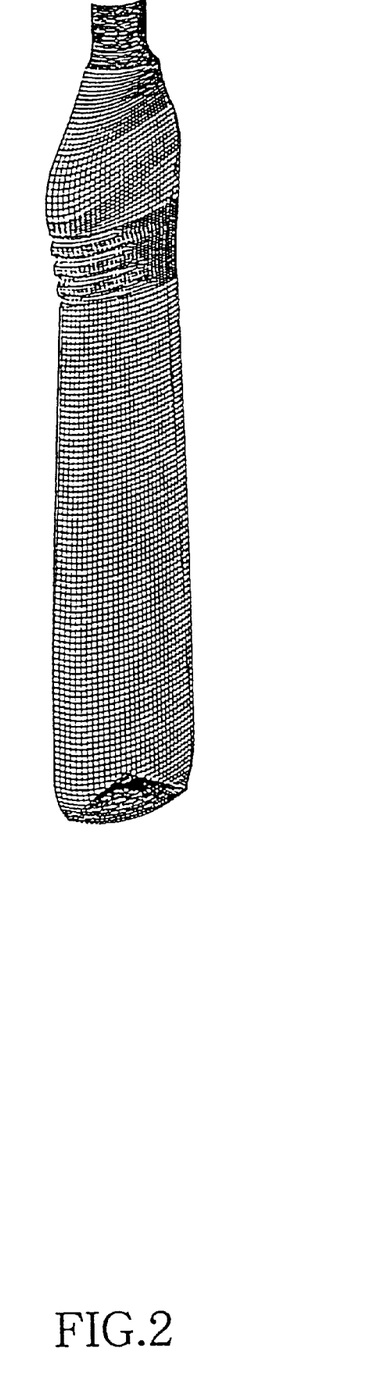
FIG. 2 shows a finite element model of a bottle.
Figure 3A:
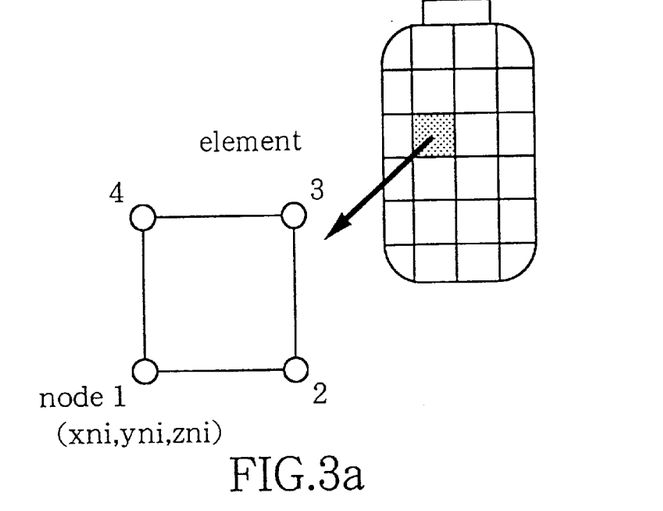
FIG. 3 serves to explain the finite element method.
Figure 3B:
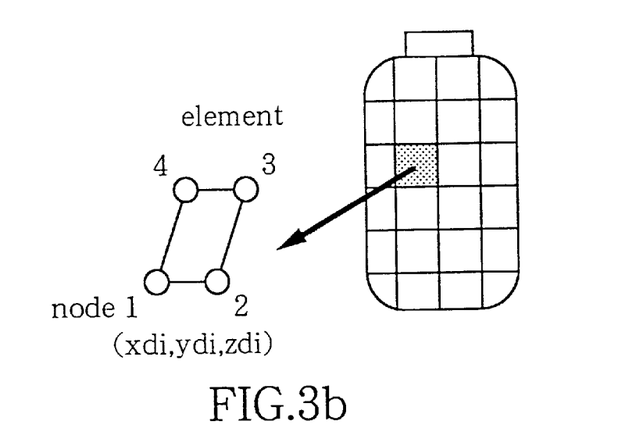
Figure 3C:
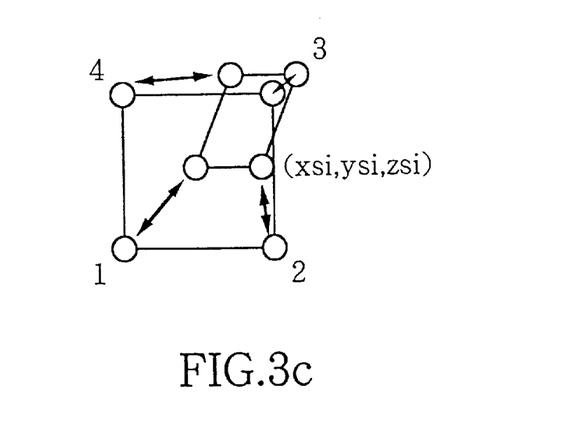

In embodiments of this invention, these calculations are performed using the finite element method (FEM). The finite element method will be explained very briefly with reference to FIG. 2 and FIG. 3. FIG. 2 depicts a finite element model of a bottle, while FIG. 3 serves to explain the finite element method. As shown in FIG. 2, a container (i.e. a shape) which is to become the object of the deformation simulation is approximated by a lattice of triangular or quadrilateral lower-order elements. As shown in FIG. 3(a), an element comprises nodes {(xni, yni, zni), i=1 to 4}. As shown in FIG. 3(b), when deformation is simulated, the nodal coordinates of the element after deformation become {(xdi, ydi, zdi, i=1 to 4)}. As shown in FIG. 3(c), the deformation of an element can be obtained by finding the difference {(xsi, ysi, zsi), i=1 to 4} between the nodal coordinates prior to deformation (xni, yni, zni) and the nodal coordinates after deformation (xdi, ydi, zdi). The finite element method is employed in similar manner to obtain the deformation of all the elements of the model shown in FIG. 2, whereby the deformed state of the entire container is found. The final design shape is determined by repeatedly performing the deformation simulation while little by little changing the design shape prior to deformation in such manner that the shape after deformation approaches the target molding shape.

[First embodiment]

A first embodiment of this invention will be explained with reference to the bottle depicted in FIG. 2 as an example. If the taking out temperature is low, i.e. if there is very little deformation (and deformation is linear), then the metal mold shape that will give the target molding shape when the shrink deformation of the plastic that has been taken out from the metal mold is completed, can be obtained by multiplying the target molding shape by the reciprocal of the deformation ratio. However, this technique cannot be applied if the taking out temperature is high, i.e. if thermal shrink is large and nonlinear.

The inventors therefore repeatedly simulated the thermal deformation that occurs in the initial shape of a molding (this shape being determined by the design shape of the metal mold), and caused any difference between this simulation result and the target molding shape to be reflected in the metal mold design shape, and repeated this process until there was a convergence to the target molding shape. They also took the nonlinearity of the deformation into consideration, and in order to stabilize the convergence, introduced a retardation coefficient for adjusting the difference that is reflected in the metal mold design shape. For this technique to work effectively, the amount of deformation and the deformed state calculated by the FEM-based deformation simulation have to be in fairly close agreement with the actual state of affairs.

Accordingly, in order to improve the simulation accuracy, the physical property parameters were adjusted so that the simulation results matched the measured displacements, these adjustments being based on the shape before and after a measurable deformation. Physical property parameters include the coefficient of linear expansion, Young's modulus, Poisson's ratio, thermal conductivity, specific heat, density, and so forth. Simulation results after parameter adjustment are given in Table 1.

TABLE 1

|  | deformation (mm) | | difference (measured − FEM) | [difference × 100]/ measured (%) |
|---|---|---|---|---|
|  | measured | FEM | | |
| waist width | −1.925 | −1.886 | −0.039 | −2.068 |
| waist depth | 2.225 | 2.350 | −0.125 | −5.618 |
| height of base indentation | −4.780 | −4.753 | −0.027 | −0.565 |

Examination of the column under "[difference×100]/measured (%)", which corresponds to the relative error, shows that this is at most 5% and that the parameter adjustment is successful.

[Second embodiment]

Figure 4:
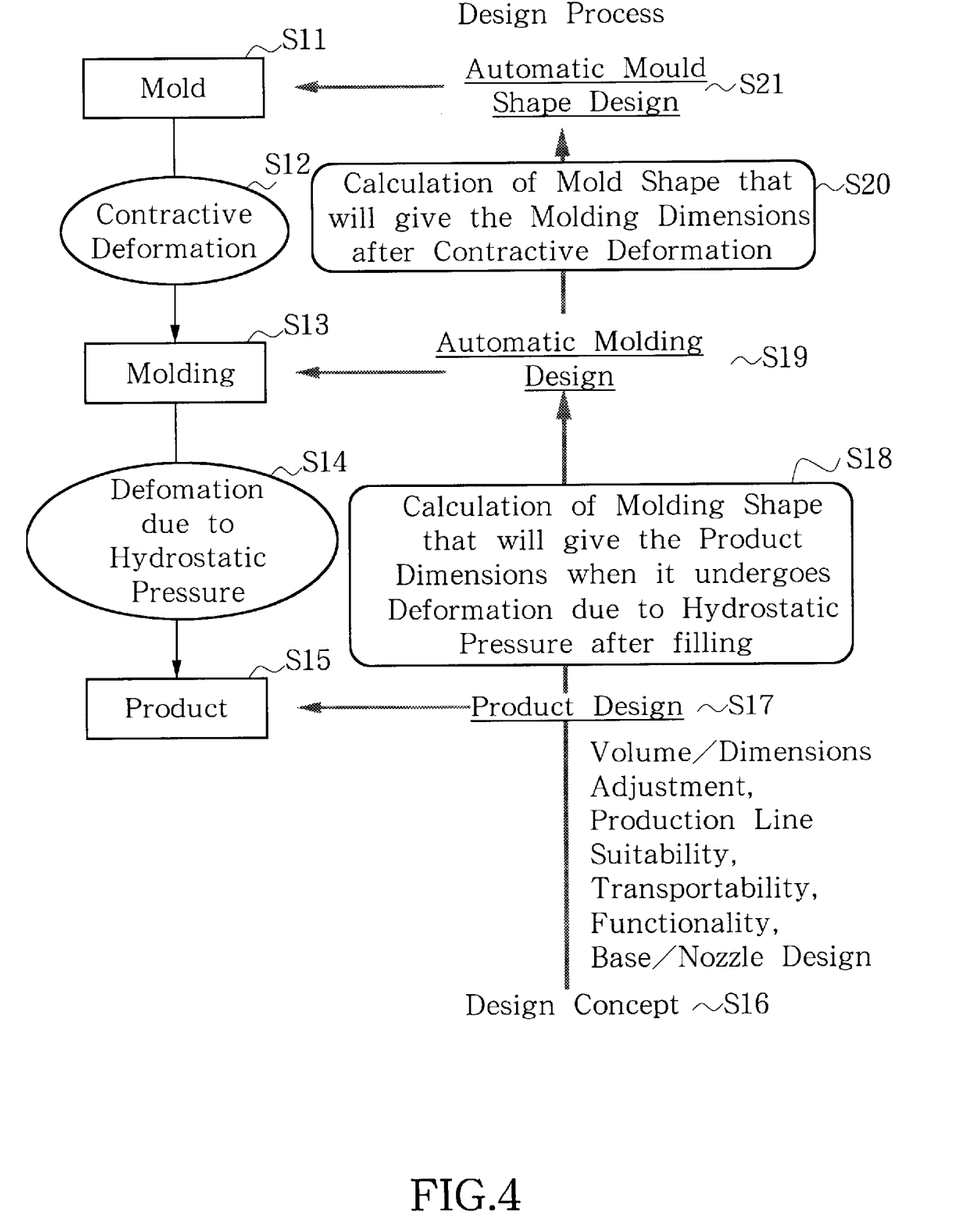
FIG. 4 is a flowchart of a metal mold design method according to a second embodiment of this invention.

A second embodiment of this invention will be explained with reference to FIG. 4, which is a flowchart of a metal mold design method according to this second embodiment. In this second embodiment, metal mold design also takes into account the deformation due to hydrostatic pressure resulting from the molded bottle having been filled with a liquid as its contents. The plastic is took out from the metal mold (S11) and undergoes thermal shrink type deformation (S12), whereby a molding is obtained (S13). As a result of this molding being filled with a liquid which constitutes its contents, it undergoes deformation due to hydrostatic pressure (S14), thereby assuming the shape of the end product (S15). In this second embodiment of the invention, this process is taken into consideration as well.

The flow of the design process proceeds in the reverse direction. That is to say, product design (S17) is carried out on the basis of a design concept (S16), and the molding is automatically designed (S19) by calculating the molding shape that will give the product dimensions when it undergoes deformation due to hydrostatic pressure after being filled with the contents (S18). The metal mold shape is also automatically designed (S21) by calculating the metal mold shape that will give the molding dimensions after shrink deformation (S20).

Thus this second embodiment has, in addition to the steps of the first embodiment, a step wherein the shape of the empty molding is compared with the shape of the molding after it has been filled with its contents, i.e. compared with the product shape, and any difference is reflected in the design shape of the metal mold. This procedure is similar to the first embodiment and is performed in accordance with the flowchart shown in FIG. 1. Parameters like those in the first embodiment are adjusted so that the simulation agrees with the measured displacements.

[Third embodiment]

A third embodiment of this invention will be explained with reference to FIG. 5, which is a block diagram of a metal mold design apparatus according to this third embodiment.

The metal mold design method disclosed in the first or second embodiment of this invention is performed by means of the metal mold design apparatus disclosed in this third embodiment. The initial shape of the metal mold (b0) is input in the form of three-dimensional information by means of keyboard 6. Deformation simulation arithmetic unit 1 calculates a simulation of the deformation that will occur after a molding equal in shape to this initial shape has been taken out from the metal mold. Difference arithmetic unit 2 calculates the difference between the calculated deformation and the target molding shape. Difference decision unit 3 compares this difference with a threshold. If this difference exceeds the threshold, initial shape change unit 4 applies a change to the initial shape on the basis of the difference. Arithmetic controller 5 causes deformation simulation arithmetic unit 1, difference arithmetic unit 2, difference decision unit 3 and initial shape change unit 4 to operate repeatedly until the aforesaid difference becomes less than the threshold.

If deformation due to hydrostatic pressure, as disclosed in the second embodiment of this invention, is to be taken into consideration as well, then deformation simulation arithmetic unit 1 calculates a simulation of the deformation that will occur after a molding equal in shape to the initial shape has been taken out from the metal mold, and also calculates a simulation of the subsequent deformation that occurs due to hydrostatic pressure arising when the molding has been filled with its contents.

In the first or second embodiments of this invention, the metal mold was opened at a temperature of about 120° C. and the cooling time was 5 seconds. In the prior art example, the metal mold was opened at a temperature of about 50° C. and the cooling time was a dozen or so seconds. It will therefore be seen that production per unit time was improved by a factor of at least two.

[Fourth embodiment]

Figure 6:
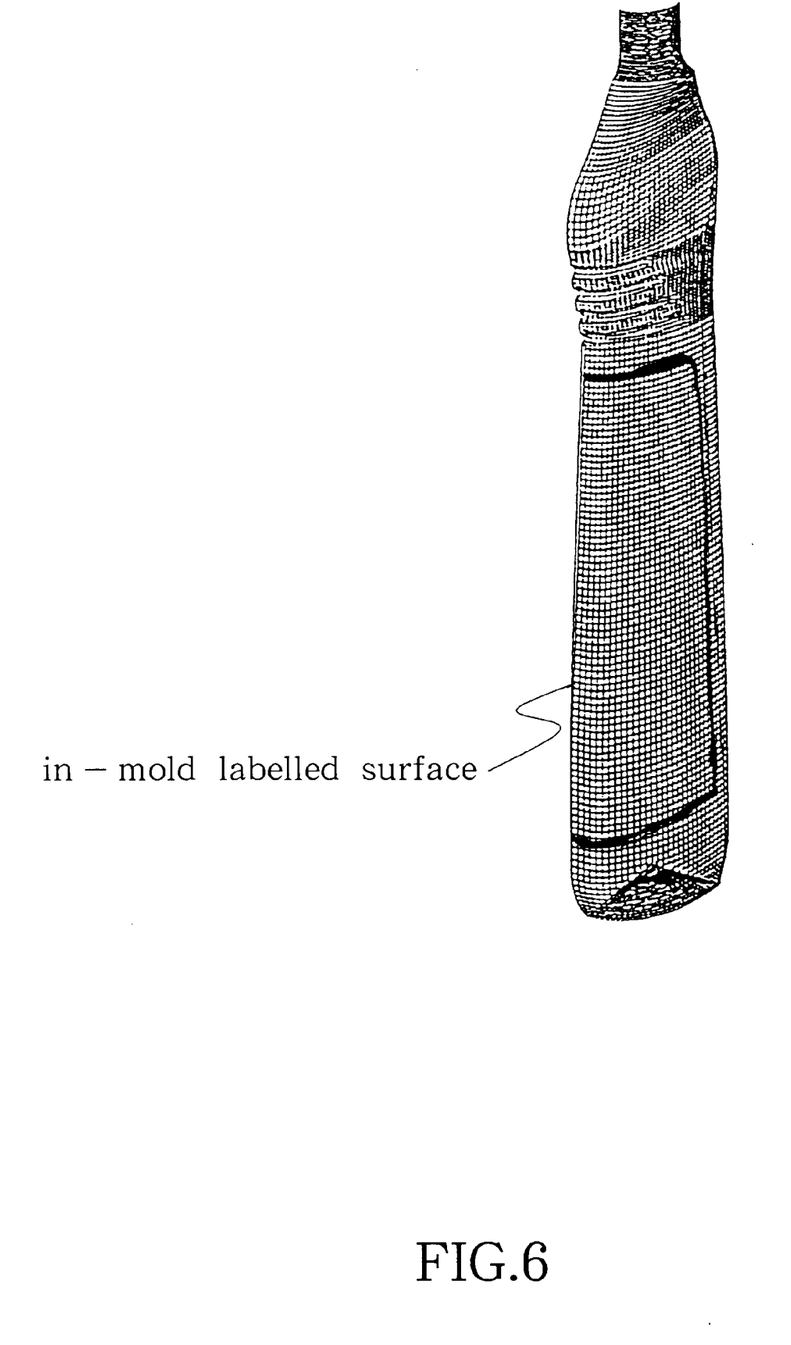
FIG. 6 shows an in-mold labelled bottle.

A fourth embodiment of this invention will be explained with reference to FIG. 1. In this fourth embodiment, a label is solvent bonded to a portion of the surface of a molding, the label being of a different material from the main material of which the molding surface is formed; and the first step depicted in FIG. 1 (S1) comprises simulating deformation after adding parameters relating to the material of this label, said parameters including at least its thermal conductivity and coefficient of linear expansion. FIG. 6 shows an in-mold labelled bottle. The FEM-based deformation simulation described previously is applied to the bottle shown in FIG. 6.

The apparatus for performing the metal mold design method according to this fourth embodiment of the invention has the same constitution as the apparatus shown in FIG. 5, except that deformation simulation arithmetic unit 1 differs from its equivalent in the first, second and third embodiments in that it simulates deformation after adding parameters relating to the material of the label, said parameters including at least thermal conductivity and coefficient of linear expansion.

Figure 7:
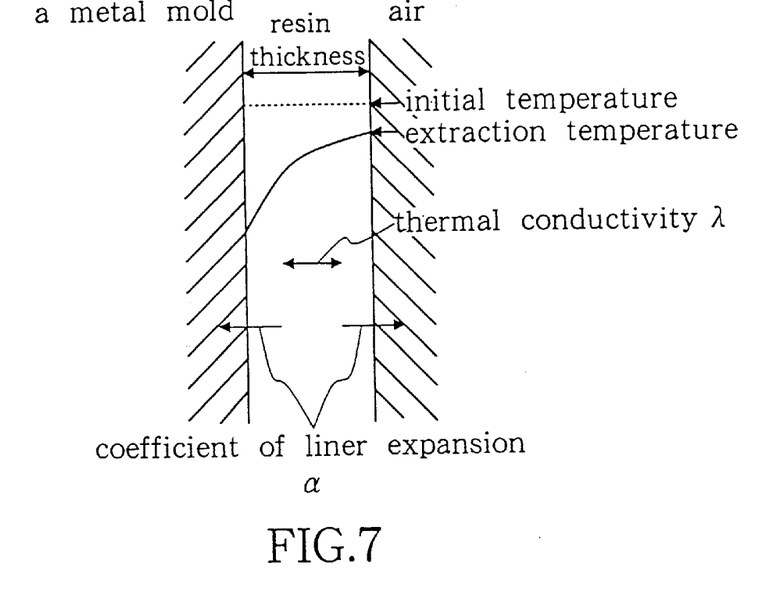
FIG. 7 shows the resin structure and parameters of a container to which an in-mold label is not being applied.
Figure 8:
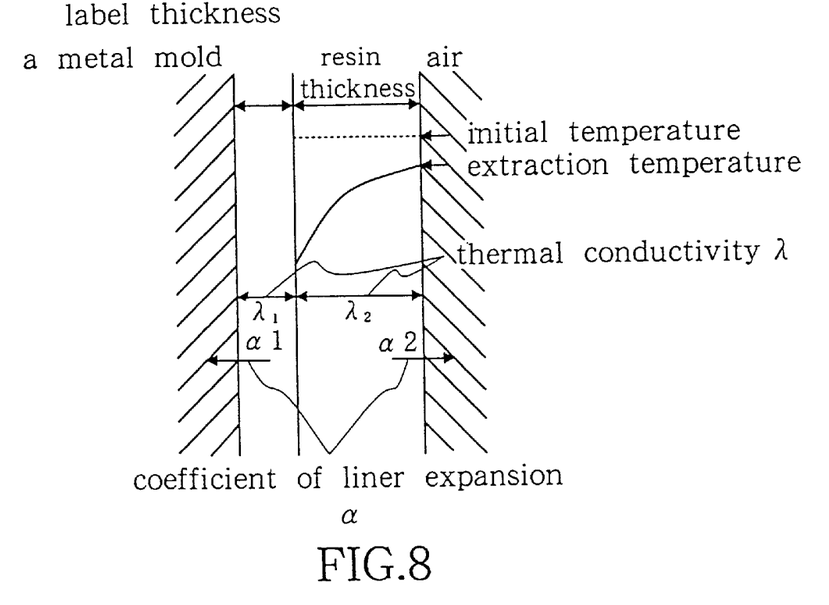
FIG. 8 shows the resin structure and parameters of the portion of an in mold labelled container to which the in-mold label is being applied.

The simulation of deformation of an in-mold labelled container will be explained with reference to FIG. 7 and FIG. 8. FIG. 7 shows the resin structure and parameters of a container to which an in-mold label is not being applied. FIG. 8 shows the resin structure and parameters of the portion of an in-mold labelled container to which the in-mold label is being applied.

In order to simulate deformation of an in-mold labelled container, first of all the physical properties of the resin of a container to which an in-mold label is not being applied are obtained, and then the physical properties of the resin of a container to which an in-mold label is being applied are found. The physical properties of both the resin used for the bottle (HDPE) and the resin used for the label (PP) are derived from these two sets of physical properties by way of subtractive considerations.

The deformation by thermal shrink of an in-mold labelled container can then be simulated using the physical properties of the resins derived in this way.

This will now be described in greater detail. Firstly, derive the thermal conductivity and coefficient of linear expansion of a container (see FIG. 7) to which an in-mold label is not being applied (1). To do this, set initial values for thermal conductivity $\lambda$ and coefficient of linear expansion $\alpha$ (2), and perform heat conduction analysis (3) and thermal stress analysis (4). If the deformation and circumferential shrink of the surface on which it is planned to apply an in-mold label are in agreement with actual deformation (5), examine the errors in the height, width and depth dimensions relative to the actual molding and terminate the calculation if these errors are smaller than the thresholds (6). If the deformation and circumferential shrink of the surface on which it is planned to apply an in-mold label are not in agreement with actual deformation, change the thermal conductivity $\lambda$ (5) and repeat the heat conduction analysis (3). If the deformation and circumferential shrink of the surface on which it is planned to apply an in-mold label are in agreement with actual deformation (5), examine the errors in the height, width and depth dimensions relative to the actual molding and if these errors are larger than the thresholds, change the coefficient of linear expansion $\alpha$ (6) and repeat the thermal stress analysis (4). The thermal conductivity and coefficient of linear expansion of the resin of a bottle without a label are derived by repeating these procedures (2) to (6).

Next, by repeating procedures (2) to (6) described above for an in-mold labelled container, derive the thermal conductivity and coefficient of linear expansion of this container (7). In other words, derive the thermal conductivity and coefficient of linear expansion of an in-mold labelled container of the sort shown in FIG. 8 (1). To do this, set initial values for thermal conductivities $\lambda 1$ and $\lambda 2$ and coefficient of linear expansion $\alpha 1$ and $\alpha 2$ (2). Perform heat conduction analysis (3) and thermal stress analysis (4). If the deformation and circumferential shrink of the surface on which the in-mold label is applied are in agreement with actual deformation (5), examine the errors in the height, width and depth dimensions relative to the actual molding and terminate the calculation if these errors are smaller than the thresholds (6). If the deformation and circumferential shrink of the surface on which the in-mold label is applied are not in agreement with actual deformation, change the thermal conductivity $\lambda 1$ and $\lambda 2$ (5) and repeat the heat conduction analysis (3). If the deformation and circumferential shrink of the surface on which the in-mold label is applied are in agreement with actual deformation (5), examine the errors in the height, width and depth dimensions relative to the actual molding and if these errors are larger than the thresholds, change the coefficient of linear expansion $\alpha 1$ and $\alpha 2$ (6) and repeat the thermal stress analysis (4). The thermal conductivity and coefficient of linear expansion of the resin of the in-mold labelled bottle are derived by repeating these procedures (2) to (6).

The physical properties of both the resin used for the bottle (HDPE) and the resin used for the label (PP) can be derived from the physical properties, obtained in this way, of the resin of the unlabelled container and the resin of the in-mold labelled container, by way of subtractive considerations. The thermal conductivity and coefficient of linear expansion of both the bottle resin (HDPE) and the label resin (PP) obtained in this fourth embodiment are shown in Table 2.

TABLE 2

|  | Unit | HDPE | PP |
| --- | --- | --- | --- |
| thermal conductivity | cal/mm s ° C. | 1.0 E-4 | 1.0 E-5 |
| thermal conductance (air) | cal/mm s² ° C. | 4.78 E-6 | — |
| thermal conductance (mold) | cal/mm s² ° C. | 6.21 E-5 | 1.00 E-5 |
| specific heat | cal/kg ° C. | 550. | 460. |
| density | kg/mm³ | .955 E-6 | .900 E-6 |
| thermal transmission efficiency | E-7 m²/s | 1.90 | 2.42 E-1 |
| coefficient of linear expansion (height) | /° C. | 1.52 E-4 | 2.00 E-5 |
| coefficient of linear expansion (around) | /° C. | 3.20 E-4 | 2.00 E-5 |
| Young's modulus | Kg f/mm² | 3.0 | 1.0 |
| Poison ratio | — | 0.4 | 0.4 |

Figure 9:
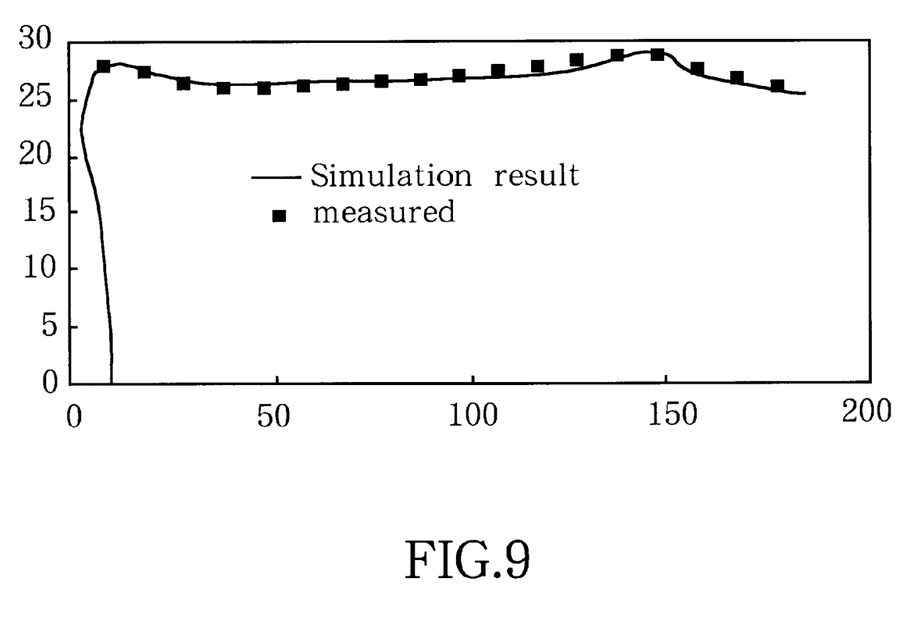
FIG. 9 compares simulated deformation by thermal shrink and actual measurements of moldings.

The deformation by thermal shrink of a container is simulated using the physical properties of the resins derived in this way. In FIG. 9, which compares simulated deformation by thermal shrink and actual measurements of moldings, the distance from the base of the bottle (i.e. height) is plotted along the horizontal axis, and the distance from the center of the base of the bottle is plotted along the vertical axis. As shown in Table 3, the errors between measured values and simulated deformation can be made extremely small. The width and depth given in Table 3 are the width and depth at the part of the bottle corresponding to a height of 100 mm.

TABLE 3

|  | height of base indentation | width | depth |
| --- | --- | --- | --- |
| measured | 182.67 | 94.44 | 52.94 |
| simulation | 183.08 | 95.12 | 52.61 |
| difference | −0.41 | −0.68 | 0.33 |

As has been explained above, a metal mold is designed by simulating the deformation due to thermal shrink of an in-mold labelled container.

Figure 1:
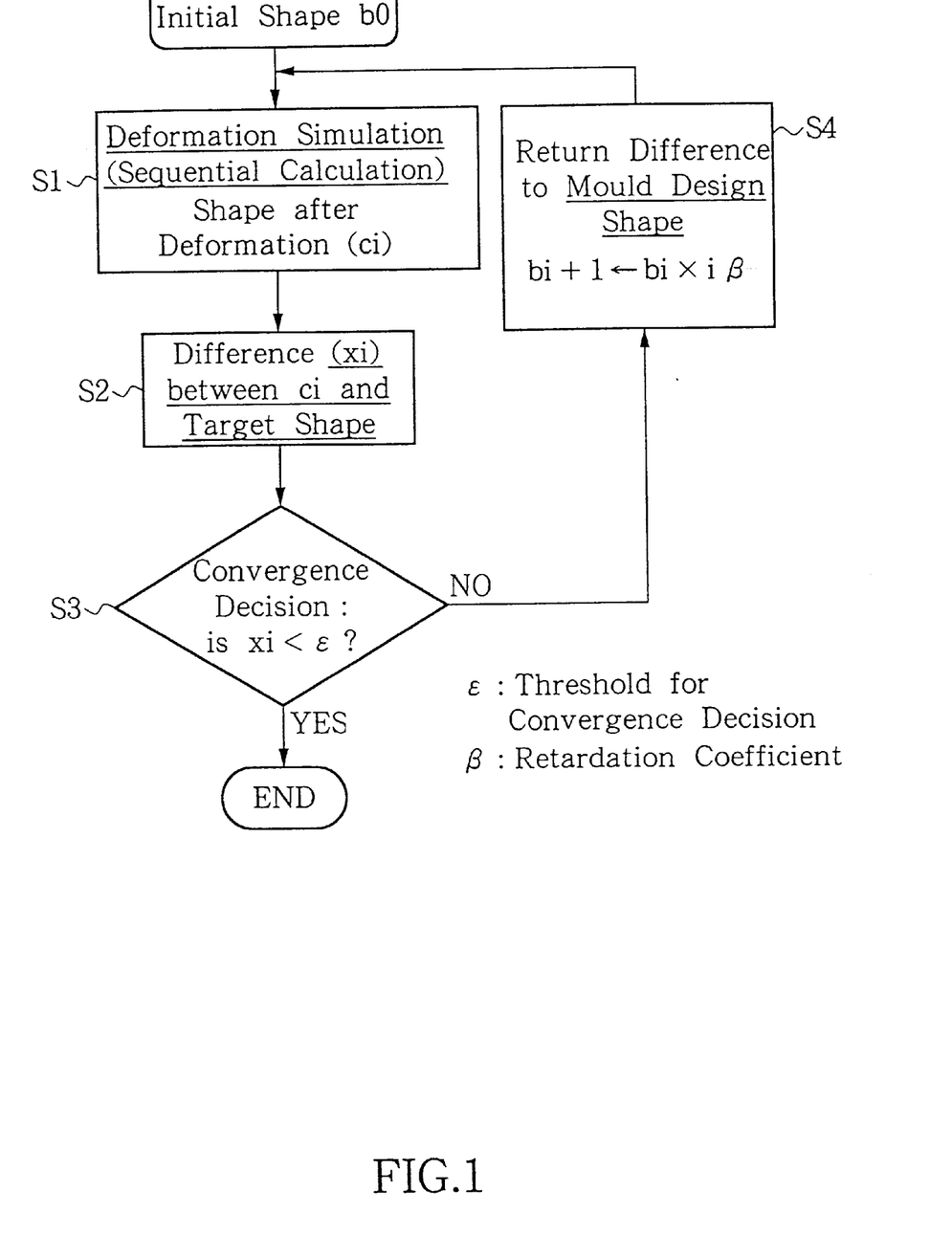
FIG. 1 is a flowchart of a metal mold design method according to an embodiment of is invention.

As shown in FIG. 1, deformation of the initial design shape of a metal mold (b0) due to thermal shrink is simulated, and any difference between this simulation result and the target molding shape is reflected in the metal mold design shape, and this process is repeated until there is a convergence to the target molding shape. The nonlinearity of the deformation is taken into consideration, and in order to stabilize the convergence, a retardation coefficient is introduced for adjusting the difference that is reflected in the metal mold design shape. For this technique to work effectively, the amount of deformation and the deformed state calculated by the FEM-based deformation simulation have to be in fairly close agreement with the actual state of affairs.

Accordingly, in order to improve the deformation simulation accuracy, the physical property parameters are adjusted so that the simulation results match the measured displacements, these adjustments being based on the shape before and after a measurable deformation. Physical property parameters include the coefficient of linear expansion, Young's modulus, Poisson's ratio, thermal conductivity, specific heat, density, and so forth. Deformation simulation results after parameter adjustment are given in Table 1.

Examination of the column under "difference×100/measured (%)", which corresponds to the relative error, shows that this is at most 5%, which means that the parameters were successfully adjusted.

As explained in connection with the second embodiment of this invention, a metal mold can be designed taking into account the deformation due to hydrostatic pressure resulting from the molded bottle being filled with a liquid as its contents, and this can be applied also to an in-mold labelled bottle according to the fourth embodiment of this invention.

As shown in Table 4, good results were obtained using a metal mold design apparatus according to this invention.

TABLE 4

|  | dimension (mm) | | difference | [difference × 100]/ |
| --- | --- | --- | --- | --- |
|  | design value | test piece | (test piece − design value) | design value (%) |
| maximum height | 74.2 | 73.71 | −0.49 | −0.66 |
| maximum thickness | 38.7 | 39.01 | 0.31 | 0.80 |
| shoulder width | 72.0 | 71.17 | −0.83 | −1.15 |
| shoulder thickness | 37.4 | 37.48 | 0.08 | 0.21 |
| waist width | 59.1 | 58.56 | −0.54 | −0.91 |
| waist thickness | 29.6 | 29.90 | 0.30 | 1.01 |
| overall height | 216.5 | 217.07 | 0.57 | 0.26 |
| nozzle height | 17.5 | 17.79 | 0.29 | 1.66 |
| inner diameter of mouth |  |  |  |  |
| width | 18.3 | 18.67 | 0.37 | 2.02 |
| thickness |  | 18.04 | −0.26 | −1.42 |
| peak-to-peak thread diameter |  |  |  |  |
| width | 25.2 | 24.88 | −0.32 | −1.27 |
| thickness |  | 24.92 | −0.28 | −1.11 |

In the fourth embodiment of this invention, the metal mold was opened at a temperature of about 120° C. and the cooling time was 5 seconds. In the prior art example, the metal mold was opened at a temperature of about 50° C. and the cooling time was a dozen or so seconds. It will therefore be seen that production per unit time was improved by a factor of at least two.

What is claimed is:

1. A method for designing a metal mold comprising:
   simulating the deformation that will occur in the initial shape of a plastic bottle after the plastic bottle has been taken out from the metal mold;
   calculating the difference between the deformed shape obtained by said simulating and a target molding shape;
   comparing this difference with a threshold value; and
   calculating a change in the initial shape on the basis of this difference when the difference exceeds said threshold value.

2. A method for designing a metal mold according to claim 1, including solvent bonding a label to a portion of a surface of the plastic bottle, said label being of a different material from the main material of which the molding surface is formed; and said simulating comprises simulating deformation after adding parameters relating to the material of the label, said parameters including at least thermal conductivity and coefficient of linear expansion.

3. A method for designing a metal mold according to claim 1 or 2, wherein said calculating the difference between said deformed shape obtained by said simulating and said target molding shape does not account for the deformation due to the internal pressure produced when the plastic bottle is filled with contents.

4. A method for designing a metal mold according to claim 1 or 2, wherein said calculating the difference between said deformed shape obtained by said simulating and said target molding shape accounts for the deformation due to the internal pressure produced when the plastic bottle is filled with contents.

5. A method for designing a metal mold according to claim 1 or 2, wherein said simulating is performed using a finite element method.

6. An apparatus for designing a metal mold comprising:

means for inputting an initial shape of the metal mold in the form of three-dimensional information;

simulation means for calculating a simulation of the deformation that will occur after a molding equal in shape to the initial shape has been taken out from the metal mold;

calculation means for calculating a difference between the calculation result for the simulated deformation and a target molding shape;

comparison means for comparing the difference with a threshold value;

means for changing the initial shape of the metal mold on the basis of the difference; and control means for causing said simulation means, said calculation means, said comparison means, and said changing means to operate repeatedly until the difference becomes less than the threshold value.

7. An apparatus for designing a metal mold according to claim 6, wherein a label is solvent bonded to a portion of a surface of the molding, the label being of a different material from the main material of which the molding surface is formed; and said simulation means simulates deformation after adding parameters relating to the material of the label, said parameters including at least thermal conductivity and coefficient of linear expansion.

8. An apparatus for designing a metal mold according to claim 6 or 7, wherein the target molding shape does not include the deformation due to the internal pressure produced when the molding is filled with contents.

9. An apparatus for designing a metal mold according to claim 6 or 7, wherein the target molding shape includes the deformation due to the internal pressure produced when the molding is filled with contents.

10. An apparatus for designing a metal mold according to claim 6, further comprising a machine readable recording medium containing at least one program for operating said simulation means, said calculation means, said comparison means, said changing means and said control means.

* * * * *